United States Patent [19]
Secondari

[11] Patent Number: 5,735,979
[45] Date of Patent: Apr. 7, 1998

[54] PNEUMATIC TIRE WITH ASYMMETRIC TREAD PROFILE

[75] Inventor: Francesco Secondari, Madison, Ala.

[73] Assignee: Dunlop Tire Corporation, Buffalo, N.Y.

[21] Appl. No.: 505,900

[22] Filed: Jul. 24, 1995

[51] Int. Cl.$^6$ .................. B60C 3/06; B60C 11/00
[52] U.S. Cl. .................. 152/209 A; 152/209 R; 152/454; 152/456
[58] Field of Search .................. 152/209 A, 209 R, 152/454–456, 123 A

[56] References Cited

U.S. PATENT DOCUMENTS

| | | | |
|---|---|---|---|
| 2,281,359 | 4/1942 | Kenner | 152/209 A |
| 4,763,708 | 8/1988 | Takahashi et al. | |
| 4,840,210 | 6/1989 | Kukimoto | 152/209 A |
| 5,301,728 | 4/1994 | Brown, Jr. et al. | |

FOREIGN PATENT DOCUMENTS

| | | | |
|---|---|---|---|
| 1257604 | 10/1989 | Japan | 152/455 |
| 3200405 | 9/1991 | Japan | 152/209 A |
| 3-271003 | 12/1991 | Japan . | |
| 4271902 | 9/1992 | Japan | 152/209 A |
| 6-64408 | 3/1994 | Japan | 152/209 A |
| 2205283 | 12/1988 | United Kingdom | 152/455 |

OTHER PUBLICATIONS

European patent office abstract, Patent Abstracts of Japan, for JP 4–110201, Apr. 10, 1992.
English Abstract of JP 6–64408, 08 Mar. 1994, Bridgestone Corp., Fukuoka Toru.
English Abstract of JP 4–271902, 28 Sep. 1992, Toyo Tire & Rubber Co. Ltd., Matsushima Yasushi.

*Primary Examiner*—Adrienne C. Johnstone

[57] ABSTRACT

A pneumatic tire comprises a carcass extending around the tire from bead to bead, sidewalls and a rubber tread region which has a profile when considered in transverse cross section of a new tire terminating the sides of the tread in inner and outer shoulder regions respectively, each of said shoulder regions having a shoulder drop, which is defined by the distance in the radially inward direction from the point of maximum tire diameter to a shoulder point at the edge of the shoulder region, wherein when the tire is mounted on a scheduled wheelrim and inflated to a scheduled pressure, the tread region has its point of maximum tire diameter offset in the axial direction of the tire from the center line of the tire section in the direction of the inner shoulder, and the shoulder drop of the outer shoulder is greater than the shoulder drop of the inner shoulder such that the tread region has an asymmetrical profile.

13 Claims, 2 Drawing Sheets

PNEUMATIC TIRE WITH ASYMMETRIC TREAD PROFILE

BACKGROUND OF THE INVENTION

1. Field of the Invention

The present invention relates to a pneumatic tire for passenger car and light truck use and in particular to the tread profile of such tires. It is particularly useful for radial tires but is not limited thereto.

2. Description of Related Art

Conventionally tires have a symmetrical tread profile when considered in cross-section to show the curvature in the radial plane. Such a profile, however is not optimized for the generation of the cornering forces necessary for vehicle handling.

Proposals have been made to use different tread compounds at either side of the tire for improved wet grip and for different tread pattern groove layouts at either side of the tread, both of which provide some asymmetry. The latter also gives increased pattern density on the outside half of the tire to improve cornering when that part of the tire is carrying most of the cornering forces but there is a reduction in wet grip due to poorer drainage.

Conventional tires use dual radii tread profiles. The central region of the tread has one large radius and the shoulders have a second substantially smaller radius. This is to provide a wider flatter tread with a more uniform contact patch to the road.

Japanese Patent publication 3271003 proposed an asymmetrical profile shape in which the outer part of the tread of the tire, when fitted to a vehicle, has a smaller radius than the inner part to for allegedly improving wet grip.

U.S. Pat. No. 4,763,708 proposed that the transverse sectional plane has a maximum outer diameter point spaced axially from the central plane of the tread and the radius of curvature of the narrower side is greater than the other side to improve the resistance to abrasion of the shoulder regions.

It has also been proposed to stiffen the inboard sidewall of the tire so that more load is carried by that sidewall to offset some of the load transfer during cornering, but the bulk of the material in the stiffened sidewall increases heat generation leading to durability problems.

(Problems to be Solved by the Present Invention)

The above tires, however, do not optimise contact patch load distribution while cornering and thus lateral grip and handling are not optimised and thus uneven wear occurs. Furthermore, for high cornering powers, known tires are very wide, which increases cost and leads to installation problems on vehicles.

SUMMARY OF THE INVENTION

It is an object of the present invention to improve lateral grip and handling properties of a tire particularly during cornering of the vehicle while minimizing the tire width.

According to the present invention, there is provided a pneumatic tire comprising a carcass extending around the tire from bead to bead, sidewalls and a rubber tread region which has a profile such that when considered in transverse cross-section of a new tire, the sides of the tread terminate in inner and outer shoulder regions respectively. Each of the shoulder regions has a shoulder drop, which is the distance in the radially inward direction from the point of maximum tire diameter to a point on the shoulder at the edge of the shoulder region. When the tire is mounted on a scheduled rim and inflated to a scheduled pressure, the tread region is asymmetric, having its point of maximum tire diameter offset in the axial direction of the tire from the center line of the tire section in the direction of the inner shoulder edge, and the shoulder drop of the outer shoulder is greater than the shoulder drop of the inner shoulder such that the tread region has an asymmetrical profile.

By the shoulder point at the edge of the shoulder region is meant the point which is the radially outer edge of the shoulder region of the tire sidewall. For a tire having a curved shoulder region, typical of modern tires, this shoulder point is found at the intersection of the extension of the line defining the tread surface and the extension of the line defining the sidewall surface.

Preferably the tire is a radial tire having a tread region reinforced by a breaker belt.

The ratio of the shoulder drop of the outer shoulder to the shoulder drop of the inner shoulder may be greater than 1.25. Preferably the ratio is in the range of 1.25 to 5.0. The inner shoulder drop may be in the range of 8 to 14 mm and the outer shoulder drop may be in the range 12 to 22 mm.

The tread profiles on opposite sides of the point of maximum tire diameter may have different radii of curvature and the tread profile on the side of the outer shoulder may have plural radii of curvature.

BRIEF DESCRIPTION OF THE DRAWINGS

To assist in understanding the invention reference is now made to the attached drawings wherein.

DETAILED DESCRIPTION OF THE INVENTION

Figure 1:
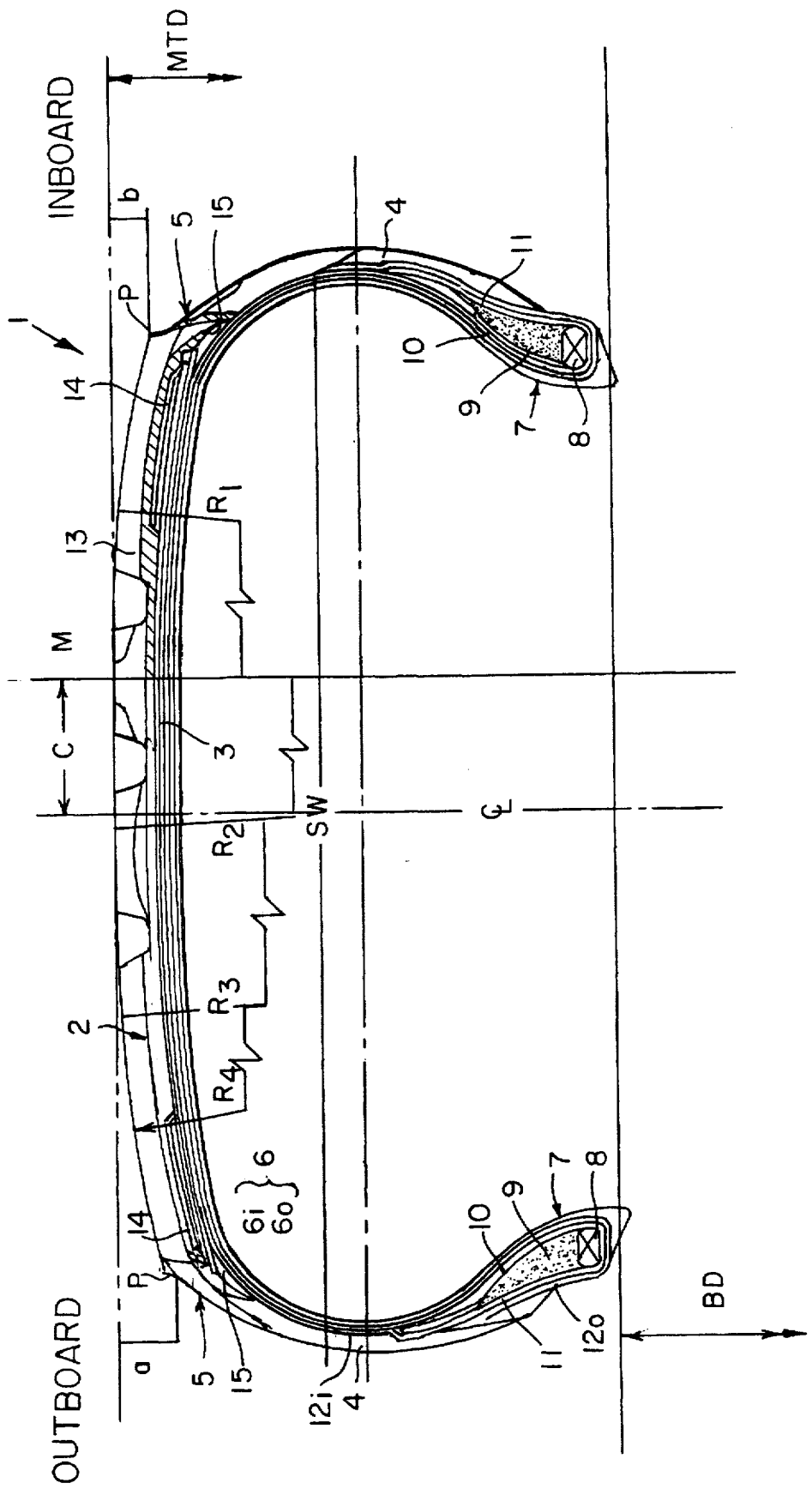
FIG. 1 is a cross-sectional view taken in a plane passing through the rotational axis of an asymmetrical tire according to the present invention.
Figure 2:
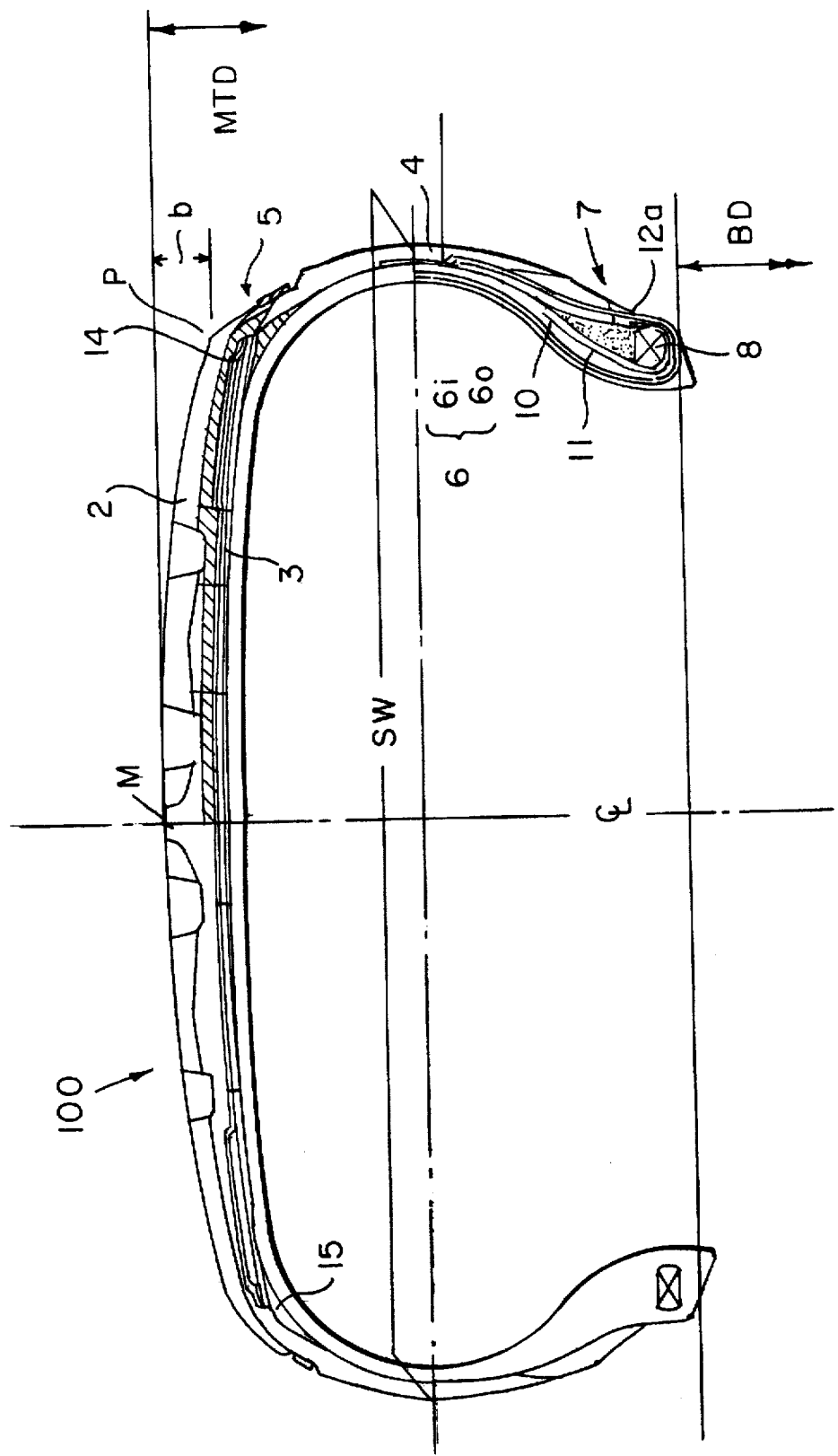
FIG. 2 is a conventional tire.

The tires 1,100 shown in FIGS. 1 and 2 respectively are both P245/50R16 size tires having a bead diameter BD of 403.1 mm, and molded dimensions of maximum section width SW of 274 mm and a maximum tire diameter MTD of 650 mm.

The tires 1,100 comprise a carcass 6 extending between two bead regions 7 through sidewalls 4 and a ground contacting tread region 2. Between the axial edges of the tread region 2 and the sidewalls 4 are tire shoulder regions 5.

The carcass 6 comprises 2 plies 6i,6o of radially extending cords which are turned around inextensible bead coils 8 located one in each bead region 7 from the axial inside to the outside to form ply turn-ups 12i,12o respectively. The ply turn-ups 12i and 12o extend to heights of 70 mm and 20 mm respectively above the bead diameter BD.

In each bead region between the carcass plies 6i,6o and the ply turn-ups 12i,12o is disposed a rubber apex 9 of hardness 93 Shore A which extends taperingly radially outward from the bead coil 8 and terminates at a position between the ends of the ply turn-ups 12i,12o. In each bead region between the apex 9 and the radially outer carcass ply 6o is disposed a flipper 10 comprising textile cords. This extends along the axially inner surface of the apex 8 from a position radially inward of the radially outer end of the apex and is wrapped around the bead and terminates on the axially outer side of the apex 9 at a radial height below that of the end of the ply turn-up 12o. The bead region 7 is further provided with a sidewall insert 11 comprising a ply of rubbered steel covered cords laid at 70° to the radial direction extending along the axially outer side of the apex 10 from a radially inward position below the end of the ply turn-up 12o radially outward beyond the end of the apex 10 and between the carcass ply 6o and the ply turn-up 12i to a position radially inward of the end of the ply turn-up 12i.

The ground contacting tread region 2 comprises a tread rubber 13 reinforced by a breaker assembly 3 disposed radially outward of the carcass 6. The breaker assembly 3 comprises two plies of breaker fabric comprising rubber coated steel cords laid parallel to each other and oppositely inclined at an angle of 24° to the circumferential direction of the tire such that the cords of one ply cross the cords of the other ply. The cords of the breaker have 2+2×0.25 mm structure laid at a density of 23 cords per inch. The breaker assembly 3 extends substantially the whole width of the ground contacting tread region 2 and the radially inner breaker ply is wider than the radially outer breaker ply.

In the axially outer regions, the breaker assembly is covered by an edge bandage 14 comprising nylon reinforcing cords. This edge bandage extends beyond the edge of the breaker assembly.

The extreme edges of the breaker assembly 3 are supported by a breaker cushion 15 disposed radially inward of the edge of the breaker assembly in the tire shoulder regions 5. Thus the curvature of the breaker assembly is maintained across the entire width.

In both tires 1,100 of FIGS. 1 and 2 the profiles of the carcass 6, the sidewalls 4 and the bead regions 7 including the positions of the components therein are substantially symmetrical about the axial centerline CL of the tire which lies in the tire circumferential plane.

In the conventional tire 100 of FIG. 2 the profile of the tread region is also symmetrical with respect to the axial centerline CL. Accordingly the maximum tire diameter MTD is located on the tread outer surface at a point M of intersection with the axial centerline CL, and the curvature of the tread surface to either side of the axial centerline CL is the same. Accordingly the shoulder drop d, which is defined as the distance in the radial direction between the point M on the tread surface of the maximum tire diameter and the shoulder point P on the radially outer edge of the shoulder region 5 at the boundary with the tread region 2, is the same on both sides of the tire. As previously mentioned in the case of tires having rounded shoulders such as those of FIGS. 1 and 2 the shoulder point P is located at the intersection of the extensions of the lines defining the tread and sidewall surfaces. In the tire of FIG. 2 the shoulder drop is 14.1 mm when the tire is mounted on a 16"×8" wheelrim and inflated to a pressure of 30 psi.

In contrast to the conventional tire, the present inventive tire 1 of FIG. 1 has a tread profile which is asymmetrical with respect to the axial centerline of the tire. The present tire has its maximum tire diameter MTD at a point M on the tread surface offset by a distance C from the axial centerline CL of the tire in the direction of the tire inner shoulder. In the case of the present embodiment the distance C is 33.5 mm. Furthermore the curvature of the tread to either side of the point M is different. In the present embodiment the tread surface lying to the right of the point M has a single curvature R1 whilst the tread surface lying to the left of the point M has a curvature defined by three radii R2, R3, and R4. The radii R1 and R2 have a common tangent at the point M. In this embodiment the values of R1-R4 for the molded tire are 360 mm, 1420 mm, 350 mm and 292.2 mm, respectively. Accordingly the shoulder drop of the present asymmetric tire is different on either side. The shoulder drop b of the inner shoulder lying nearest to the point M is 11.3 mm whilst the shoulder drop a of the outer shoulder lying further from the point M is 19.8 mm when the tire is mounted on a 16"×8" wheelrim and inflated to a pressure of 30 psi.

Tires having constructions according to FIGS. 1 and 2 but having identical tread patterns were tested using a 1993 model Z28 Camaro high performance passenger vehicle.

The asymmetric tire was fitted to all four wheels of the vehicle such that the point M of the maximum tire diameter MTD was nearest the inboard wheel flange, i.e. the larger shoulder drop a (=19.8 mm) was towards the outside of the wheel.

The asymmetric and conventional constructions were assessed for ride and handling characteristics and also tread temperature. Details of these tests and results are shown in Table 1. The results of the mild handling and ride tests are presented in Table 1 as a subjective ranking wherein a higher value represents a better performance.

The test results presented in Table 1 show that the asymmetric construction improved mild and maximum subjective handling and also improved measured lateral acceleration and records lap times. Slightly heavier steering on-center and quicker response contributed to a more confident feel when driving on the asymmetric tire. During moderate lane changes, the asymmetric tire exhibited less tendency to slide out. Under maximum handling conditions the asymmetric construction provided better 'turn-in', i.e. steering response from maximum deceleration to maximum cornering, as well as better progression at the limit.

The loaded tire temperatures were measured immediately after the completion of the lateral acceleration test which was carried out by driving the vehicle in a circle on an asphalt surface. The recorded temperature profiles presented in Table 1 are for the outside pair of tires in the lateral acceleration test. The temperature profiles show the asymmetric tire had a more uniform temperature distribution implying that the load is distributed more evenly and the tread contact area is being used more efficiently. Furthermore the maximum tire temperature of the asymmetric tire is reduced by 10° C. which would increase the resistance to tread chunking and abrasion under maximum handling conditions.

The cornering characteristics of the present asymmetric tire compared with the conventional tire were further determined by the measurement of lateral force at various slip angles. This testing was carried out using an MTS 1 Flat-Trac test machine. The asymmetric tire was mounted on the test rim such that turning the tire towards the shoulder having the lesser shoulder drop b corresponds to a negative slip angle and positive force direction in standardised force and moment terms. Testing was carried out at 25%, 50% and 100% of the scheduled tire load of 715 kg over a range of slip angles of −15 to +15 degrees. Results of these tests are shown in Table 2.

The results of Table 2 clearly show that the asymmetric tire generates more cornering force throughout the entire range of negative slip angles, i.e. when the tire is turning towards the shoulder having the lesser shoulder drop b. In the slip angle range of 0 to +3.0 degrees, i.e. when the tire is turned slightly towards the shoulder having the greater shoulder drop, the conventional symmetrical tire generates slightly more cornering power. This is thought to be due to a residual cornering force RCF. However as the tire is turned further in this direction at slip angles of +3.0 and higher the asymmetric tire again shows greater cornering power.

Accordingly the data presented in Table 2 is in accordance with the vehicle test results of Table 1. In Table 2 the data for 100% load is the nearest representation of a maximum cornering situation in which almost all of the vehicle load is on the outside tires. The negative slip angle results of Table 2 represent the situation when the outside tires are tires properly orientated to take advantage of the asymmetric effect. The asymmetric tire has greater cornering power and a significantly reduced rate of cornering power loss as slip angle increases beyond the peak. This is manifest as higher lateral acceleration and improved breakaway characteristics noted during the maximum handling tests. Furthermore since it is known that with conventional tires the rate of cornering power loss as the slip angle is increased beyond the peak increases with speed, it is the case that with increasing speeds the asymmetric tire will corner increasingly better than the conventional tire with straight-ahead running where slip angles are low and there is little load transfer on the tires. This situation is represented by the 50% load results of Table 2. The asymmetric tire doubles the inward force on each side of the vehicle while running straight ahead. This is thought to be the reason for the heavier on-center feel observed in the vehicle handling test. At 1.0 degree of slip angle, the asymmetric tire on the loaded side generates 10% more cornering power which is thought to contribute to the observed off-center response.

While the above-described embodiment has a tread profile defined by three radii of curvature on the side of the tread having the greater shoulder drop and a single radius of curvature on the opposite side of the point of maximum tire diameter, it should be appreciated that other tread profiles are possible within the scope of the invention. For example the tread profile may have a single radius of curvature on both sides of the point of maximum tire diameter or may have a plurality of radii on either or both sides.

Also while the above-described embodiment has the ratio of the shoulder drop of the outer shoulder to the shoulder drop of the inner shoulder set at a value of substantially 1.75, this ratio may have within the invention any value greater than 1.25 or more preferably in the range of 1.25 to 5.0 giving the above described advantages.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| TIRE | A | B |
|---|---|---|
| CONSTRUCTION | FIGURE 2 | FIGURE 1 |
| FEATURE | CONTROL CONVENTIONAL PROFILE | EMBODIEMENT ASYMMETRICAL PROFILE |
| SIZE | P245/50ZR16 | P245/50ZR16 |
| MILD HANDLING | | |
| STEERING RESPONSE | 6.3 | 6.2 |
| LINEARITY | 6.5 | 6.6 |
| LANE CHANGE | 6.5 | 6.7 |
| COMMENTS | | HEAVIER CENTER FEEL |
| RIDE | | |
| HARSHNESS-LARGE | 6 | 6.1 |
| HARSHNESS-SMALL | 6 | 6 |
| DAMPING | 6 | 6 |
| MAXIMUM HANDLING | | |
| LAP TIME (sec) | 43.59 | 43.18 |
| LAP INDEX | 100 | 102 |
| LATERAL ACC'L'N (g) | 0.85 | 0.88 |
| TRANSIENT STABILITY | 6.5 | 6.8 |
| PROGRESSION | 6.5 | 6.6 |
| COMMENTS | | SUPERIOR RESPONSE PROGRESSION |
| LOADED TIRE TEMP. (Deg. C.) (INBOARD, CENTRE, OUTBOARD) | | |
| FRONT | 75, 125, 150 | 85, 125, 140 |
| REAR | 65, 90, 95 | 70, 95, 90 |
| TEST CONDITIONS | | |
| VEHICLE | 1993 Z28 CAMARO | 1993 Z28 CAMARO |
| WHEEL RIM | 16 × 8 | 16 × 8 |
| TIRE INFLATION PRESSURE | 30 PSI ALL | 30 PSI ALL |
| WEATHER | CLOUDY | CLOUDY |
| AMBIENT TEMP (Deg. C.) | 30 | 30 |

TABLE 2

| SLIP ANGLE (Deg) | LOAD (Kg) | FORCE AND MOMENT TEST RESULTS | | | | | | | | | | |
|---|---|---|---|---|---|---|---|---|---|---|---|---|
| | | LATERAL FORCE (Kg) | | | ALIGNING TORQUE (Nm) | | | LOAD SENSITIVITY | | CORNERING COEFFICIENT | | |
| | | 179 | 358 | 715 | 179 | 358 | 715 | 179–358 | 358–715 | 179 | 358 | 715 |
| TIRE A | | | | | | | | | | | | |
| −15 | | 126.6 | 225.8 | 430.5 | 0.3 | 0.1 | 0.4 | 0.554 | 0.573 | 0.707 | 0.631 | 0.602 |
| −12 | | 132.0 | 234.2 | 457.2 | 0.2 | 0 | 0 | 0.571 | 0.625 | 0.737 | 0.654 | 0.639 |
| −9 | | 140.8 | 246.6 | 489.7 | 0.2 | −0.2 | −0.7 | 0.591 | 0.681 | 0.787 | 0.689 | 0.685 |

TABLE 2-continued

| SLIP ANGLE (Deg) | LOAD (Kg) | LATERAL FORCE (Kg) | | | ALIGNING TORQUE (Nm) | | | LOAD SENSITIVITY | | CORNERING COEFFICIENT | | |
|---|---|---|---|---|---|---|---|---|---|---|---|---|
| | | 179 | 358 | 715 | 179 | 358 | 715 | 179–358 | 358–715 | 179 | 358 | 715 |
| −8 | | 143.5 | 251.7 | 501.5 | 0.1 | −0.3 | −1.1 | 0.604 | 0.7 | 0.802 | 0.703 | 0.701 |
| −7 | | 147.9 | 253.7 | 505.8 | 0 | −0.5 | −2.3 | 0.591 | 0.706 | 0.826 | 0.709 | 0.707 |
| −6 | | 149.5 | 262.4 | 517.7 | 0.1 | −0.6 | −3.4 | 0.631 | 0.715 | 0.835 | 0.733 | 0.724 |
| −5 | | 149.4 | 266.2 | 516 | −0.1 | −1.3 | −5.2 | 0.653 | 0.7 | 0.835 | 0.744 | 0.722 |
| −4 | | 147.7 | 270.1 | 518.2 | −0.3 | −1.5 | −7.9 | 0.684 | 0.695 | 0.825 | 0.754 | 0.725 |
| −3 | | 139.9 | 259 | 475.3 | −0.6 | −2.5 | −11.1 | 0.665 | 0.606 | 0.782 | 0.723 | 0.665 |
| −2 | | 119.6 | 221.3 | 378.5 | −1 | −3.7 | −14.3 | 0.568 | 0.44 | 0.668 | 0.618 | 0.529 |
| −1 | | 78.9 | 141.6 | 213.7 | −1.2 | −3.8 | −12.6 | 0.35 | 0.202 | 0.441 | 0.396 | 0.299 |
| 0 | | 4.3 | 10.2 | 12.1 | −0.2 | −0.7 | −1.9 | 0.033 | 0.005 | 0.024 | 0.028 | 0.017 |
| 1 | | −73.2 | −125.4 | −185 | 1 | 2.9 | 9.6 | −0.292 | −0.167 | −0.409 | −0.35 | −0.259 |
| 2 | | −116.8 | −214 | −363.6 | 0.9 | 3.5 | 13.9 | −0.543 | −0.419 | −0.653 | −0.598 | −0.509 |
| 3 | | −137.3 | −256.9 | −469.9 | 0.6 | 2.4 | 11.1 | −0.668 | −0.597 | −0.767 | −0.718 | −0.657 |
| 4 | | −144 | −269.3 | −515.1 | 0.4 | 1.5 | 8.1 | −0.7 | −0.689 | −0.804 | −0.752 | −0.72 |
| 5 | | −144.7 | −267.2 | −525.1 | 0.7 | 1.1 | 5.3 | −0.684 | −0.722 | −0.808 | −0.746 | −0.734 |
| 6 | | −144.4 | −263.3 | −527.6 | 0 | 0.6 | 3.6 | −0.664 | −0.74 | −0.807 | −0.735 | −0.738 |
| 7 | | −143.4 | −258.2 | −514.8 | 0 | 0.5 | 2.4 | −0.641 | −0.719 | −0.801 | −0.721 | −0.72 |
| 8 | | −140.7 | −250.3 | −500.5 | −0.1 | 0.4 | 1.3 | −0.612 | −0.701 | −0.786 | −0.699 | −0.7 |
| 9 | | −139.2 | −246.4 | −497.6 | −0.2 | 0.3 | 0.7 | −0.599 | −0.704 | −0.778 | −0.688 | −0.696 |
| 12 | | −130.8 | −229.6 | −471.3 | −0.3 | 0.2 | −0.4 | −0.552 | −0.677 | −0.731 | −0.641 | −0.659 |
| 15 | | −122.6 | −217.5 | −441.8 | −0.3 | 0.2 | −0.3 | −0.53 | −0.628 | −0.685 | −0.608 | −0.618 |
| TIRE B | | | | | | | | | | | | |
| −15 | | 137.5 | 238.3 | 513.2 | 0.3 | 0.1 | 0.4 | 0.563 | 0.77 | 0.768 | 0.666 | 0.718 |
| −12 | | 144.3 | 243.8 | 543.4 | 0.3 | −0.1 | 0 | 0.556 | 0.839 | 0.806 | 0.681 | 0.76 |
| −9 | | 150.7 | 254.6 | 577 | 0.2 | −0.2 | −0.5 | 0.58 | 0.903 | 0.842 | 0.711 | 0.807 |
| −8 | | 154.6 | 262.2 | 584.4 | 0.2 | −0.2 | −1 | 0.601 | 0.903 | 0.864 | 0.732 | 0.817 |
| −7 | | 156.5 | 271.2 | 581.6 | 0.3 | −0.3 | −3 | 0.641 | 0.869 | 0.874 | 0.755 | 0.813 |
| −6 | | 157 | 275.1 | 579.5 | 0.1 | −0.4 | −4.3 | 0.66 | 0.853 | 0.877 | 0.768 | 0.81 |
| −5 | | 155.8 | 274.7 | 572.8 | −0.1 | −1.5 | −6 | 0.664 | 0.835 | 0.87 | 0.767 | 0.801 |
| −4 | | 152.5 | 273 | 524.4 | −0.3 | −1.3 | −8.8 | 0.673 | 0.755 | 0.852 | 0.763 | 0.759 |
| −3 | | 144.1 | 258.8 | 488.1 | −0.6 | −2.2 | −11.4 | 0.641 | 0.642 | 0.805 | 0.723 | 0.683 |
| −2 | | 124.7 | 227.8 | 385.7 | −1.1 | −3.4 | −13.7 | 0.576 | 0.442 | 0.697 | 0.636 | 0.539 |
| −1 | | 83.9 | 149.7 | 225.1 | −1.2 | −3.8 | −11.6 | 0.368 | 0.211 | 0.469 | 0.418 | 0.315 |
| 0 | | 7.4 | 15.6 | 30.5 | −0.2 | −0.6 | −1.4 | 0.046 | 0.042 | 0.041 | 0.044 | 0.043 |
| 1 | | −75.3 | −125.2 | −162.5 | 0.9 | 3.2 | 10.5 | −0.279 | −0.104 | −0.421 | −0.35 | −0.227 |
| 2 | | −120.7 | −218.6 | −357.1 | 0.9 | 3.6 | 16 | −0.547 | −0.388 | −0.674 | −0.611 | −0.499 |
| 3 | | −142 | −261.3 | −483.8 | 0.5 | 2.4 | 12.6 | −0.666 | −0.623 | −0.793 | −0.73 | −0.677 |
| 4 | | −150.1 | −275.7 | −537.8 | 0.2 | 1.5 | 8.9 | −0.702 | −0.734 | −0.839 | −0.77 | −0.752 |
| 5 | | −154.7 | −281.5 | −559.3 | 0 | 1.2 | 6.3 | −0.708 | −0.778 | −0.864 | −0.786 | −0.782 |
| 6 | | −153.9 | −281.4 | −562.9 | −0.1 | 0.5 | 4.4 | −0.712 | −0.789 | −0.86 | −0.786 | −0.787 |
| 7 | | −154.2 | −280.8 | −562.8 | −0.2 | 0.4 | 3.4 | −0.707 | −0.79 | −0.861 | −0.784 | −0.787 |
| 8 | | −150.9 | −275 | −546.5 | −0.2 | 0 | 2.4 | −0.693 | −0.761 | −0.843 | −0.768 | −0.764 |
| 9 | | −150.3 | −272.2 | −544 | −0.3 | 0 | 1.7 | −0.681 | −0.761 | −0.84 | −0.76 | −0.761 |
| 12 | | −143 | −257.9 | −532.6 | −0.4 | 0.1 | 0.3 | −0.642 | −0.769 | −0.799 | −0.72 | −0.745 |
| 15 | | −135.4 | −244.8 | −518.3 | −0.4 | 0.1 | −0.7 | −0.611 | −0.766 | −0.756 | −0.684 | −0.725 |

Having now described my invention what I claim is:

1. A pneumatic tire comprising a carcass extending around the tire from bead to bead, sidewalls and a rubber tread region which has a profile such that when considered in transverse cross section of a new tire, the sides of the tread terminate in inner and outer shoulder regions, respectively, each of said shoulder regions having a shoulder drop, which is defined by the distance in the radially inward direction from the point of maximum tire diameter to a shoulder point at the edge of the shoulder region, wherein when the tire is mounted on a scheduled wheelrim of a vehicle and inflated to a scheduled pressure, the tread region has its point of maximum tire diameter offset in the axial direction of the tire from the centerline of the tire section in the direction of the inner shoulder, and the shoulder drop of the outer shoulder is greater than the shoulder drop of the inner shoulder such that the tread region has an asymmetrical profile, wherein the tread profile on the side of the point of the maximum tire diameter having the largest shoulder drop is defined by a plurality of radii of curvature.

2. A tire according to claim 1, wherein the tire has a radial carcass and the tread region is reinforced by a breaker belt.

3. A tire according to claim 1, wherein the ratio of the shoulder drop of the outer shoulder to the shoulder drop of the inner shoulder is greater than 1.25.

4. A tire according to claim 1, wherein the ratio of the shoulder drop of the outer shoulder to the shoulder drop of the inner shoulder is in the range of 1.25 to 5.0.

5. A tire according to claim 1, wherein the ratio of the shoulder drop of the outer shoulder to the shoulder drop of the inner shoulder is substantially 1.75.

6. A tire according to claim 1, wherein the shoulder drop of the inner shoulder is in the range of 8 to 14 mm.

7. A tire according to claim 1, wherein the shoulder drop of the outer shoulder is in the range of 12 to 22 mm.

8. A tire according to claim 1, wherein the shoulder drop of the inner shoulder is 11.3 mm and the shoulder drop of the outer shoulder is 19.8 mm.

9. A tire according to claim 1, wherein the tread profiles on opposite sides of the point of maximum tire diameter have different radii of curvature.

10. A tire according to claim 9, wherein the radii of curvature on opposite sides of and immediately adjacent to the point of maximum tire diameter have a common tangent at the point of maximum tire diameter.

11. A tire according to claim 1, wherein the tread profile on the side of the point of maximum tire diameter having the largest shoulder drop is defined by three radii of curvature.

12. A tire according to claim 11, wherein the tread profile on the opposite side of the point of maximum tire diameter has a single radius of curvature.

13. A pneumatic tire mounted on a vehicle, said pneumatic tire comprising a carcass extending around the tire from bead to bead, sidewalls and a rubber tread region which has a profile such that when considered in transverse cross section of a new tire, the sides of the tread terminate in inner and outer shoulder regions, respectively, each of said shoulder regions having a shoulder drop, which is defined by the distance in the radially inward direction from the point of maximum tire diameter to a shoulder point at the edge of the shoulder region, wherein when the tire is inflated to a scheduled pressure, the tread region has its point of maximum tire diameter offset in the axial direction of the tire from the centerline of the tire section in the direction of the inner shoulder, and the shoulder drop of the outer shoulder is greater than the shoulder drop of the inner shoulder such that the tread region has an asymmetrical profile, wherein the tread profile on the side of the point of the maximum tire diameter having the largest shoulder drop is defined by a plurality of radii of curvature.

* * * * *